United States Patent [19]

Mims

[11] Patent Number: 4,535,881
[45] Date of Patent: Aug. 20, 1985

[54] SORTING APPARATUS FOR FOOD ITEMS

[76] Inventor: Herman Mims, 601 N. I-85, Charlotte, N.C. 28216

[21] Appl. No.: 404,733

[22] Filed: Aug. 3, 1982

[51] Int. Cl.³ .............................................. B65G 47/26
[52] U.S. Cl. .................................... 198/420; 198/459; 198/491
[58] Field of Search ............... 198/459, 491, 492, 663, 198/623, 420, 445, 425, 722, 612, 613, 723; 221/224, 237

[56] References Cited

U.S. PATENT DOCUMENTS

| | | | |
|---|---|---|---|
| 2,699,278 | 1/1955 | Wysocki | 198/459 |
| 2,991,869 | 7/1961 | Packman et al. | 198/623 |
| 3,599,781 | 8/1971 | Hoadley | 198/723 |

Primary Examiner—Joseph E. Valenza
Assistant Examiner—Kyle E. Shane
Attorney, Agent, or Firm—Sughrue, Mion, Zinn, Macpeak, and Seas

[57] ABSTRACT

An apparatus for conveying and sorting food items into parallel lines of uniformly spaced food items. Food items are received onto a conveyor belt from a baking or other processing station with the items arranged generally randomly. Guides direct the food items into parallel lines to a set of rotary members mounted upon a rotary shaft above the conveyor belt. Two rotary members are provided for each line of food items. Each of the rotary members is constructed of a central hub having a plurality of retractable spokes extending therefrom. Two spokes are in contact with the surface of the conveyor belt at any one time. The distance between the ends of the spokes in contact with the conveyor belt is set to be approximately the same as the diameter of the food items being conveyed. The food items engage the spokes of the rotary members in much the same manner as the teeth of a sprocket gear engage a chain to thus maintain a uniform spacing between food items in each line.

7 Claims, 4 Drawing Figures

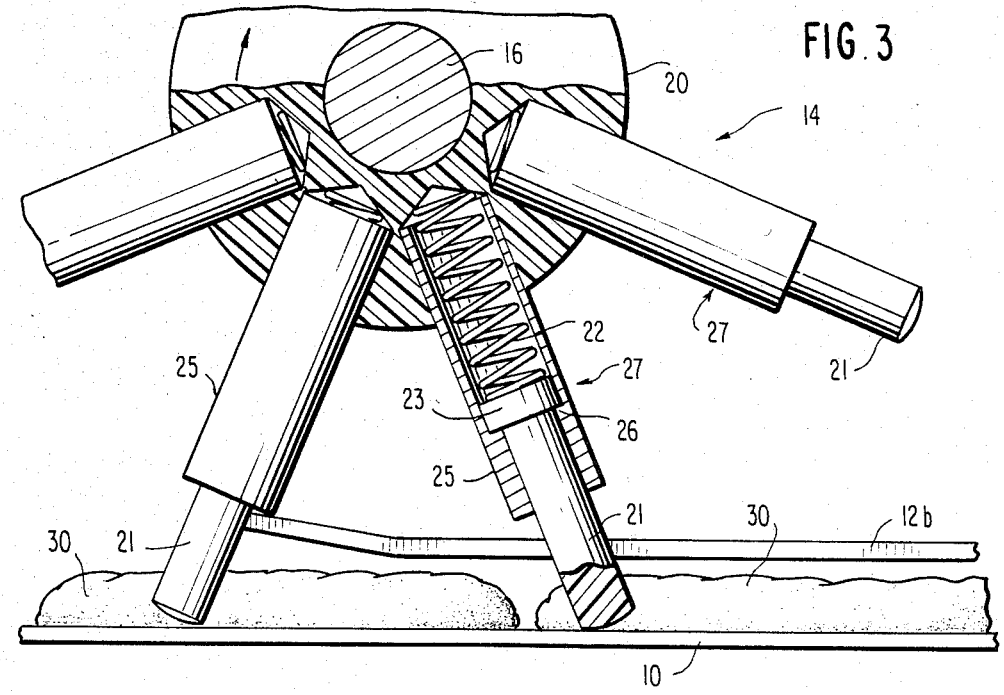
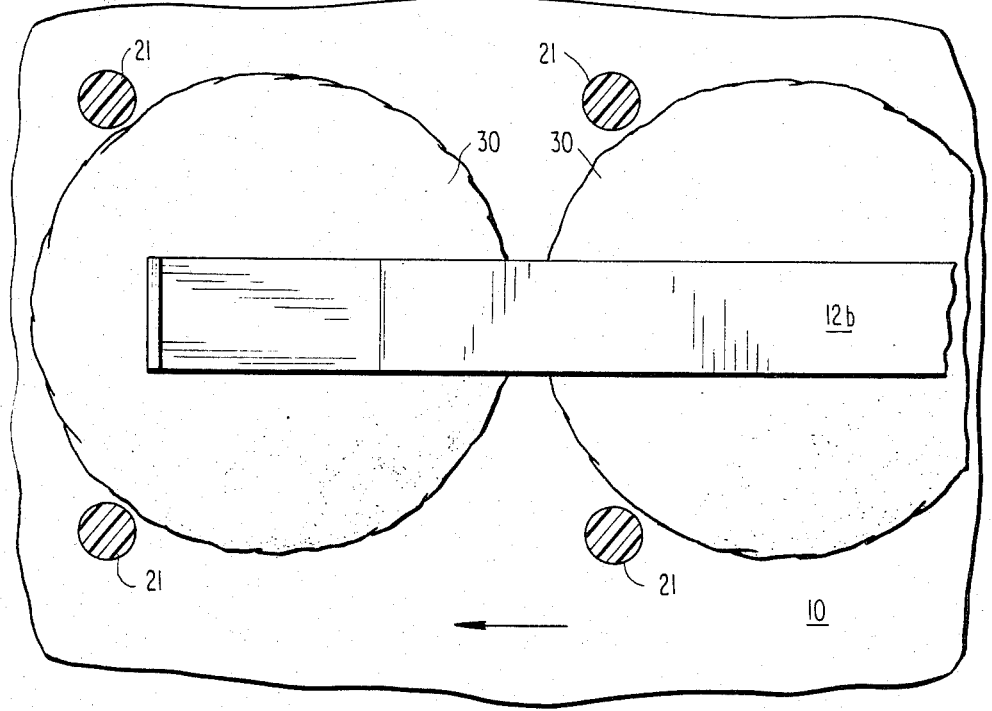

SORTING APPARATUS FOR FOOD ITEMS

BACKGROUND OF THE INVENTION

The invention pertains to an apparatus for conveying and sorting food items. In particular, the invention relates to an apparatus for removing single food items from a random stream of such items to form a single stream of food items having uniform distances between the items.

In the preparation of food items such as cookies, after the cookies have been baked, they are transferred from an oven to a conveyor belt to be conveyed thereby to a packaging station. When the cookies are dropped onto the conveyor belt from the oven, they are arranged randomly. In order to facilitate the packaging operation, it is desired to arrange the cookies into uniform streams or lines having uniform distances between cookies. It was the prior practice in the baking industry to use stationary guide members which directed the random streams of cookies into aligned streams. However, stationary members are not capable of arranging the streams of cookies with uniform distances between adjacent cookies.

Sorting devices are also used in other arts. For instance U.S. Pat. No. 1,523,985 to Parker discloses a device for filling matchboxes in which a rotary member with retractable spokes is utilized to separate a mass of matchsticks into a plurality of discreet bundles. As the matchsticks leave a conveyor, they come into contact with extended spokes of a rotary member. The distance between the extended spokes is approximately equal to the length of the box trays into which the matches are to be packaged. Such a device has not been found suitable though for separating items such as cookies. The spokes of the rotary guide of Parker are extended by the force of gravity. Rapid movement of the spokes when being extended in this manner could easily damage cookies. Moreover, Parker's device can only separate items into bundles and not single items.

U.S. Pat. No. 2,685,910 to Frederick discloses a machine for corrugating fibrous webs in which a rotary element is used to perform the actual corrugating operation. A rotary device is provided with spring loaded opposite spokes. That is, the spokes which are directly opposite one another are forced apart by a spring disposed between the two spokes. A cam is disposed axially within the rotary member such that the spokes are extended one after the other as the inside ends thereof come into contact with the increasing diameter of the axial cam. This arrangement has not found application in the food items sorting art for several reasons, including the fact that the rotary member cannot be used adjacent a conveying surface due to the forced extension of the spokes.

It is an object of the present invention to provide an apparatus for conveying and sorting food items, specifically cookies and like shaped items, in which the food items are directed into single streams having uniform distances between the items.

It is a further object of the invention to provide such a conveying and sorting apparatus in which the conveying and sorting process is carried out without damage to the food items.

SUMMARY OF THE INVENTION

In accordance with these and other objects of the invention, there is provided a food items conveying and sorting apparatus in which the food items to be sorted are first conveyed in a random stream to a rotary sorter upon a conveying surface such as a conveyor belt. The rotary sorter is composed of a plurality of rotary members disposed upon a single shaft and rotated together above the conveying surface at a speed such that the horizontal speed of the rotary member, at the surface of the conveyor, is slightly less than that of the conveyor itself (FIG. 4). Each rotary member is provided with a plurality of outwardly extending spring-loaded spokes. The distance between the outward ends of two adjacent spokes corresponds approximately to the diameter of the food items to be conveyed and separated so that two spokes can substantially stroddle one food item. The spring-loaded spokes are depressed against the conveying surface as the rotary members are rotated so that the ends of the spokes are in engagement with the conveying surface for a predetermined distance of movement of the food items past the rotary sorter.

Each rotary member is composed of a central body or hub adapted to be mounted upon a shaft common to all rotary members of the sorter. Extending from this hub are a plurality of spokes, for example, four to eight. Each spoke is composed of a hollow cylindrical shaft having an inner portion and an outer portion with the outer portion having a smaller inner diameter than the inner portion so that a shoulder is formed between the inner and outer portions of the shaft. A tip member is slidably disposed in the shaft. The tip mamber has an outer part which slides through the outer portion of the shaft and an enlarged inner end having an outer diameter larger than the inner diameter of the outer portion of the shaft. A spring, specifically, a coil spring, is disposed within the inner portion of the shaft urging the tip member outwardly. Outward movement of the tip member is restrained by the enlarged end of the tip member striking the shoulder formed between the inner and outer portions of the shaft.

The hub and the tip members may, for instance, be made of a plastic material such as nylon, while the shafts are preferably made of a noncorrosible metal.

In the rotary sorter, guides are provided which separate the stream of food items being conveyed into parallel lines of items prior to the items reaching the rotary members. Two rotary members are provided for each of these lines with the spokes of the rotary members pressingly engaging the surface of the conveying surface towards the sides of the lines of food items. As each food item passes under the two rotary members for its line, it will be engaged and surrounded at four corners by tip members of the two rotary members pressing against the conveying surface. The predetermined distance through which the ends of the spokes are engaged with the conveying surface as the rotary members are rotated is greater than the length of a single food item. In this manner, a second food item will be engaged before a first food item is released.

BRIEF DESCRIPTION OF THE DRAWINGS

FIG. 3 is a cross-sectional view showing details of one of the rotary members utilized in the apparatus of FIGS. 1 and 2; and FIG. 4 is an enlarged top view illustrating the separation of food items attained with the invention.

DESCRIPTION OF THE PREFERRED EMBODIMENTS

Figure 1:
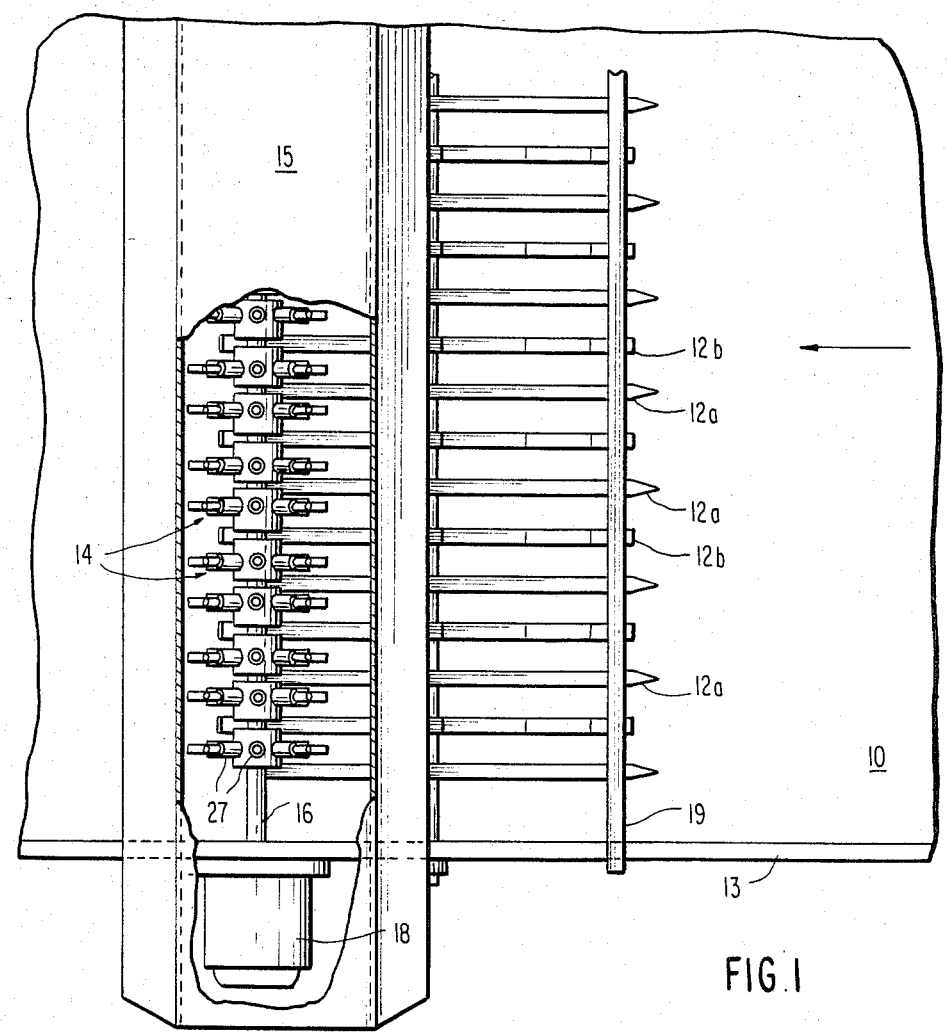
FIG. 1 is a top view of a food item sorting and conveying apparatus of the invention.
Figure 2:
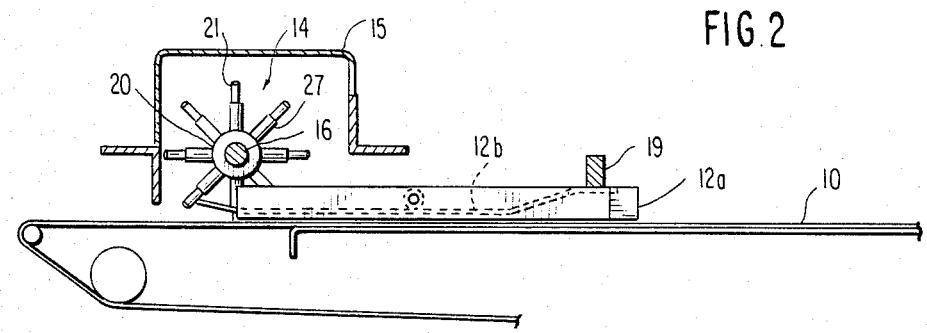
FIG. 2 is a side view of the apparatus shown in FIG. 1.

Referring first to FIG. 1, there is shown therein a top view of a food items sorting and separating apparatus of the invention.

Food items, for instance cookies 30, are deposited following baking or other food processing step onto a conveyor belt 10. The cookies 30 at the time that they are transferred onto the conveyor belt 10 are generally randomly distributed. A plurality of first parallel guides 12a, supported by a frame 19, extend downwardly from the frame 19 to very near the upper surface of the conveyor belt 10. Rotary guides, as disclosed in my copending application Ser. No. 175,480, filed Aug. 5, 1980, may also be provided near the input ends of the guides 12a to enhance the sorting function provided by the guides 12a. Second guides 12b extend parallel to the guides 14 and are interleaved therewith. However, the second guides 12b do not extend so near the upper surface of the conveyor belt 10 as the guides 12a. Side rails 13 are provided on both sides of the conveyor belt 10.

A shaft 16 rotated by a motor 18 is mounted above the surface of the conveyor belt 10 near the ends of the guides 12a and 12b. The shaft 16 has a longitudinal axis perpendicular to the direction of movement of the conveyor belt 10. Upon the shaft 16 are mounted a plurality of rotary members 14 which are rotated with the shaft 16 to form a rotary sorter. Two rotary members 14 are provided between each pair of adjacent guides 12a. Each such pair of rotary members 14 is phased (adjusted in rotational position relative to each other) such that the spokes thereof are parallel. A hood 15 covers the rotary members 14, the shaft 16, the motor 18 and adjacent portions of the guides 12a and 12b.

Details of the construction of the rotary members 14 are shown in the cross-sectional view of FIG. 3. As shown therein, each rotary member 14 has a central hub 20 which is designed to be rigidly attached to the shaft 16, for instance, with a set screw (not shown). Extending from the hub 20 are a plurality of spokes 27, for instance, eight spokes spaced from one another by a uniform angle of 45°. Each spoke 27 is composed of a hollow cyclindrical shaft 25 and a tip member 21. The shaft 25 has an outer portion having a smaller inner diameter than the inner diameter of the inner portion of the shaft so that a shoulder 26 is formed therebetween. The tip member 21 is slidably disposed in the shaft 25 in such a manner that the end of the tip member can protrude from the outer end of the shaft 25. A coil spring 22 urges the tip member 21 outwardly from the hub 20. The tip member 21 has an enlarged end 23 which, in the extended position of the tip member 21, can rest upon the shoulder 26 to prevent the tip member 21 from being pushed out or falling out of the shaft 25.

When in contact with the surface of the conveyor belt, the distance between two adjacent spoke tips should be approximately the diameter of the cookies to be conveyed and sorted. Also, the distance along the conveyor belt through which a spoke tip remains in contact with the conveyor belt surface should be sufficiently great that a second cookie is engaged by the rotary member before a first cookie is released.

In a preferred embodiment, the hub 20 and tip members 21 may be fabricated with a plastic material, for instance, nylon, while the shafts 25 are made from a non-corrosible metal.

In operation, the guides 12a serve to separate the cookies into parallel lines. The parallel lines of cookies thus formed, prior to their reaching the rotary sorter, will of course still be somewhat randomly distributed within the lines. The guides 12b, which lie above parallel lines of cookies, ensure that only one cookie at a time can reach the rotary members 14, that is, the guides 12b eliminate stacking of cookies 30 prior to their reaching the rotary members 14.

As can be seen most clearly in FIGS. 3 and 4, as the cookies approach the two rotary members 14 for its particular line, the cookies are engaged by the spokes of the rotary members much like the teeth of a gear engage the links of a chain in a chain and sprocket arrangement. In this manner, a uniform spacing is maintained between cookies in each line of cookies, while very fast conveyance and sorting of cookies is obtained without danger of damage to the cookies.

If desired, the rotary members 14 for two adjacent lines of cookies can be phased so that the cookies of the two adjacent lines emerge from the rotary members 14 immediately adjacent one another. Otherwise, the rotary members 14 for adjacent lines of cookies can be phased so that the cookies emerge staggered from line to line.

Also, it is possible to provide separate conveyor belts for each line of food items to be separated. In that case, the ends of the spokes of the rotary members need not be made retractable as the ends of the spokes can then extend below the surface of belt through slots between adjacent belts.

This completes the description of the preferred embodiments of the invention. Although preferred embodiments have been described, it is believed that numerous alterations and modifications thereto would be apparent to one having ordinary skill in the art without departing from the spirit and scope of the invention.

I claim:

1. Apparatus for arranging conveyed food items into one or more parallel lines of uniformly spaced food items, comprising:

a travelling web conveyor having a planar conveying surface for receiving food items to be conveyed and sorted, said food items having a thickness which is relatively smaller than a length or width dimension thereof;

a plurality of indexing rotary members disposed above said conveying surface for peripherially contacting and uniformly spacing said food items while said food items are being advanced by said conveyor; each of said rotary members having a plurality of spokes extending therefrom and respectively extending to aat least said conveying surface and each of said spokes being resiliently urged into contact with said planar conveying surface, said spokes having a smaller horizontal velocity, at said conveying surface, than said conveying surface;

means for rotating said rotary members, said spokes being arranged such that a pair of spokes on one said rotary member may be in simultaneous contact with said planar conveying surface such that one spoke contacts said surface before a rotationally preceeding spoke leaves said surface, and said spokes of pairs of adjacent rotary members having a pitch in the lateral direction of said conveying surface which is less than a diameter of one of said food items, whereby a pair of said spokes substantially straddle one of said food items; and guide means for guiding said food items in at least one parallel line to said rotary members.

2. The apparatus of claim 1, wherein said rotary members are disposed adjacent to and parallel to one another and in a straight line perpendicular to a direction of movement of said conveying surface.

3. The apparatus of claim 2, wherein two of said rotary members are provided for each said line of food items.

4. The apparatus of claim 3, wherein each of said spokes comprises a retractable end portion, whereby said retractable end portions of said spokes are brought into contact with said conveying surface and remain in contact with said conveying surface through a predetermined distance in the direction of conveyance.

5. The apparatus of claim 4, wherein each of said rotary members comprises a central hub; and wherein each of said spokes comprises a hollow cylindrical shaft having an inner portion rigidly attached to said hub and an outer portion having an inner diameter less than the inner diameter of said inner portion, a tip member slidably disposed in said shaft and having an outer end protruding past an outer end of said outer portion of said shaft and an enlarged inner end adapted to abut a shoulder formed between said inner and outer portions of said shaft to stop movement of said tip member through said shaft, and a spring for urging said tip member outwardly.

6. The apparatus as claimed in claim 5, wherein said means for rotating said rotary members comprises a shaft, each of said rotary members being secured to said shaft; and a motor for rotating said shaft.

7. The apparatus as claimed in claim 6, wherein said guide means comprises a first set of parallel guides extending downwardly to a position near said conveying surface; and a second set of guides extending parallel to guides of said first set of guides, one of said second guides being disposed between each two adjacent ones of said guides of said first set of guides and above said conveying surface.

* * * * *